US010423720B2

(12) United States Patent
Folting

(10) Patent No.: US 10,423,720 B2
(45) Date of Patent: *Sep. 24, 2019

(54) DISPLAYING MULTIPLE ROW AND COLUMN HEADER AREAS IN A SUMMARY TABLE

(71) Applicant: Microsoft Technology Licensing, LLC, Redmond, WA (US)

(72) Inventor: Allan Folting, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/149,951

(22) Filed: Oct. 2, 2018

(65) Prior Publication Data
US 2019/0034401 A1 Jan. 31, 2019

Related U.S. Application Data

(63) Continuation of application No. 15/240,046, filed on Aug. 18, 2016, now Pat. No. 10,108,598, which is a continuation of application No. 13/668,931, filed on Nov. 5, 2012, now Pat. No. 9,436,671, which is a continuation of application No. 12/369,004, filed on Feb. 11, 2009, now Pat. No. 8,312,366.

(51) Int. Cl.
*G06F 17/24* (2006.01)
*G06F 17/21* (2006.01)
*G06F 3/0482* (2013.01)

(52) U.S. Cl.
CPC .......... *G06F 17/246* (2013.01); *G06F 17/212* (2013.01); *G06F 17/245* (2013.01); *G06F 3/0482* (2013.01)

(58) Field of Classification Search
CPC .............................. G06F 17/245; G06F 17/246
See application file for complete search history.

(56) References Cited

U.S. PATENT DOCUMENTS 7,143,339 B2* 11/2006 Weinberg ............... G06F 17/243
715/212
2006/0101324 A1* 5/2006 Goldberg ............... G06F 17/245
715/227
2006/0129913 A1* 6/2006 Vigesaa ................ G06F 17/211
715/250

(Continued)

OTHER PUBLICATIONS

"Office Action Issued in Indian Patent Application No. 5324/CHENP/2011", dated Dec. 18, 2018, 7 Pages.

(Continued)

*Primary Examiner* — Asher D Kells
(74) *Attorney, Agent, or Firm* — Schwegman Lundberg & Woessner, P.A.

(57) ABSTRACT

A data analysis program receives a selection of data fields defining multiple row header areas and/or multiple column header areas for display in a summary table. Data is read from a data source containing values for the data fields and transformed into summary level data for building the summary table. A display is rendered in the summary table for each of the multiple row header areas and column header areas defined, with the row header areas being displayed vertically adjacent to one another and the column header areas being displayed horizontally, adjacent to one another.

20 Claims, 8 Drawing Sheets

(56) References Cited

U.S. PATENT DOCUMENTS

| | | | |
|---|---|---|---|
| 2007/0061369 A1* | 3/2007 | Folting | G06F 17/246 |
| 2007/0074130 A1* | 3/2007 | Folting | G06F 17/246 |
| | | | 715/792 |
| 2007/0174245 A1* | 7/2007 | Folting | G06F 16/20 |
| 2009/0031208 A1* | 1/2009 | Robinson | G06F 17/245 |
| | | | 715/227 |
| 2009/0049372 A1* | 2/2009 | Goldberg | G06F 17/245 |
| | | | 715/227 |

OTHER PUBLICATIONS

"Office Action Issued in Canadian Patent Application No. 2,939,600", dated Nov. 14, 2018, 4 Pages.

"Office Action Issued in Mexican Patent Application No. MX/a/2016/016638", (w/ English Translation), dated Apr. 12, 2019, 4 Pages.

* cited by examiner

| | 204 | 206 | | | 208 | 210 | 212 | | | 214 |
|---|---|---|---|---|---|---|---|---|---|---|
| | YEAR | QUARTER | DATE | CUST # | PROMOTION | CATEGORY | TYPE | PRODUCT | QTY | SALES |
| 202A | 2002 | Q1 | 01/03/02 | 9434 | | NON-FOOD | BICYCLES | BOYS RED RACER 22" | 1 | $42.79 |
| 202B | 2002 | Q1 | 01/08/02 | 1293 | CEREAL COUPON | FOOD | MEAT | TOURTIERE | 2 | $12.54 |
| 202C | 2002 | Q1 | 01/17/02 | 3928 | SUMMER SALE | NON-FOOD | TVS | 27" SUPERSHARP FLAT LCD | 1 | $32.00 |
| 202D | 2002 | Q2 | 04/21/02 | 7121 | | FOOD | PASTA | GNOCCHI DI NONNA ALICE | 2 | $14.91 |
| 202E | 2002 | Q3 | 08/02/02 | 9823 | BUY 1 GET 2 | FOOD | PASTA | RAVIOLI ANGELO | 3 | $5.64 |

DISPLAYING MULTIPLE ROW AND COLUMN HEADER AREAS IN A SUMMARY TABLE

CROSS REFERENCE TO RELATED APPLICATIONS

This application is a continuation of co-pending U.S. application Ser. No. 15/240,046 filed Aug. 18, 2016 entitled "Displaying Multiple Row and Column Header Areas in a Summary Table," which application is a continuation of co-pending U.S. application Ser. No. 13/668,931 filed Nov. 5, 2012, now U.S. Pat. No. 9,436,671, entitled "Displaying Multiple Row and Column Header Areas in a Summary Table," which application is a continuation of U.S. application Ser. No. 12/369,004 filed Feb. 11, 2009, now U.S. Pat. No. 8,312,366, entitled "Displaying Multiple Row and Column Header Areas in a Summary Table," each of which are incorporated herein by reference in their entirety.

BACKGROUND

A summary table is a data summarization tool that allows detailed, transactional source data to be "rolled-up" or summarized at varying levels of detail. Summary table functionality, also known as pivot tables, can be found in data visualization and analysis programs such as spreadsheets programs and data reporting tools. The data analysis program may allow a user to draw the summary table as a grid, specifying data fields from the source data for the row and column labels of the grid as well as the data values summarized in the grid. The data analysis program may then group, sort, count, and/or total the data values in the grid based on the row and column labels extracted from the source data.

The data analysis program may allow the user to specify multiple data fields for the row and/or column labels of the summary table. In this case, the data analysis program traditionally displays the data values summarized hierarchically by the row or column labels based on the order of the data fields specified. The data analysis program may also allow the user to interactively manipulate the summary table, expanding and collapsing row labels or column labels in the hierarchy to display more or fewer data values, depending on the user's requirements.

Traditional implementations of summary tables are limited to a single set of row labels, or "row header area," and single set of column labels, or "column header area," As a consequence, a user wishing to have data summarized for two distinct views of data, for example, two different row headers areas based on different or the same data fields from the source data summarized across a common set of column labels, may have to build two separate summary tables. This creates a cumbersome process requiring redundant parameters to be specified as well as redundant displays of the common column labels. This also limits the ability of the distinct views of data to be manipulated together, for example, by grouping, expanding, or collapsing column labels or applying table level filters or other table level operations.

It is with respect to these considerations and others that the disclosure made herein is presented.

SUMMARY

Technologies are described herein for displaying multiple row and column header areas in a summary table. Utilizing the technologies described herein, a data analysis program may display multiple row header areas, multiple column header areas, or both in a single summary table. This may allow a user of the data analysis program to create two or more distinct views of summarized data that may be expanded or collapsed, sorted, or filtered independently, while allowing the views to be manipulated together in the context of the overall summary table.

According to one embodiment, a data analysis program receives a selection of data fields defining multiple row header areas and/or multiple column header areas for display in a summary table. Data is read from a data source containing values for the data fields and transformed into summary level data for constructing the summary table. A display is rendered in the summary table for each of the multiple row header areas and column header areas defined, with the row header areas being displayed vertically adjacent to one another and the column header areas being displayed horizontally adjacent to one another.

It should be appreciated that the above-described subject matter may be implemented as a computer-controlled apparatus, a computer process, a computing system, or as an article of manufacture such as a computer-readable medium. These and various other features will be apparent from a reading of the following Detailed. Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a data listing showing exemplary source data used in constructing a summary table, according to embodiments described herein;

FIGS. 6A and 6B are screen diagrams showing an exemplary user interface for specifying data fields for multiple row and/or column header areas for display in a summary table, according to embodiments described herein.

DETAILED DESCRIPTION

The following detailed description is directed to technologies for displaying multiple data row and column header areas in a summary table. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and that show, by way of illustration, specific embodiments or examples. In the accompanying drawings, like numerals represent like elements through the several figures.

Figure 1:
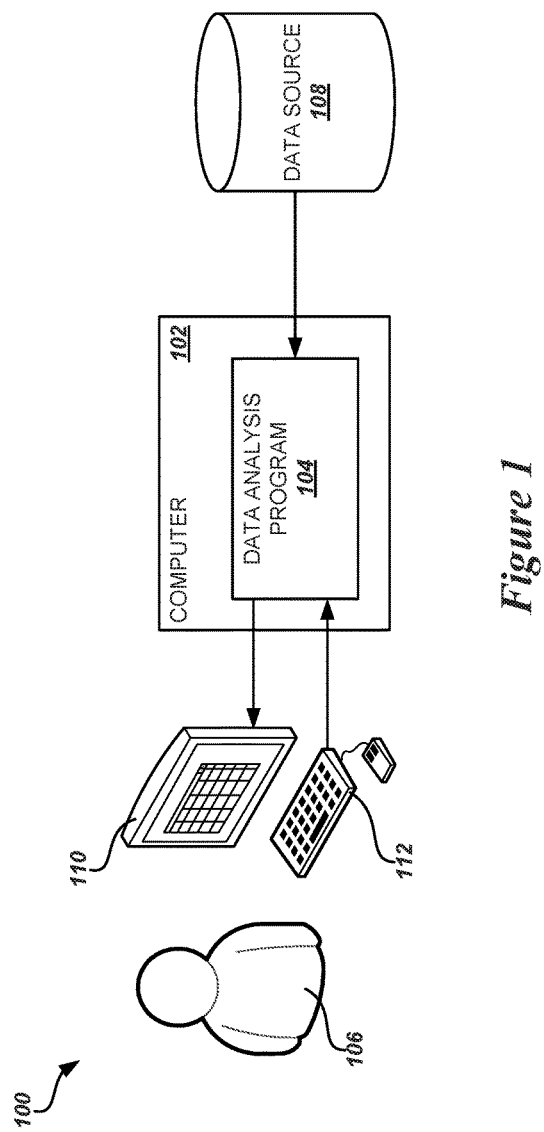
FIG. 1 is a block diagram showing aspects of an illustrative operating environment and several software components provided by the embodiments presented herein.

FIG. 1 shows an illustrative operating environment 100 including several software components for displaying multiple data row and column header areas in a summary table, according to embodiments provided herein. The environment 100 includes a computer 102. The computer 102 may be a personal computer ("PC"), a desktop workstation, a laptop, a notebook, a personal digital assistant ("PDA"), an application server, a Web server hosting Web-based application programs, or any other computing device that can execute application programs.

The computer 102 executes a data analysis program 104. The data analysis program 104 is an application program that allows a user 106 of the computer 102 to visualize and manipulate data contained in a data source 108 accessible by the computer. The data analysis program 104 may be a spreadsheet program, such as the MICROSOFT® EXCEL® spreadsheet software from Microsoft Corporation of Redmond, Wash., or the IBM® LOTUS® 1-2-3® spreadsheet software from IBM Corporation of Armonk, N.Y. The data analysis program 104 may also be a data reporting application, such as SAP® BUSINESSOBJECTS™ CRYSTAL REPORTS from SAP, AG of Waldorf, Germany. The data source 108 may be a file system attached to or accessible by the computer 102 and may contain spreadsheet files or other data files. The data source 108 may also be a database or multi-dimensional online analytical processing ("OLAP") cube containing detailed and/or summarized data which may be queried by the data analysis program 104.

According to embodiments described herein, the data analysis program 104 is operative to retrieve data from the data source 108 and transform the data through summarization functions into a summary table which is displayed to the user 106 on a display device 110 connected to the computer 102. The display device 110 may be a computer monitor, a flat-panel display, a digital projector, a printer, a plotter, or any other output device attached to the computer 102. The display device 110 may also be a Web browser application program or other application program executing on a remote computing device accessing the computer 102 over a network. The user may utilize input devices 112 connected to the computer 102 or remote computing device, such as a keyboard, mouse, touchscreen, stylus, or trackball, to control or manipulate the display of the summary table on the display device 110.

FIG. 2 shows an example of a source data listing 200 that may be transformed by the data analysis program 104 to the summary table displayed to the user 106 on the display device 110. The source data listing 200 may be contained in a spreadsheet file loaded by the data analysis program 104, or it may be provided by a database server as the result of a query issued by the data analysis program against the source data. It will be appreciated that the source data listing may be obtained by the data analysis program 104 from any number of sources known in the art beyond those described herein. The source data listing 200 may contain data rows 202A-202E (referred to herein collectively as data rows 202) representing individual transactions, such as individual sales for a retail sales company, or the data listing may contain data rows pre-summarized to a lowest level of detail desired in the summary table.

Each of the data rows 202 of the source data listing 200 may contain a number of data fields, such as the year field 204, the quarter field 206, the promotion field 208, the category field 210, the type field 212, and the sales field 214, as shown in FIG. 2. Using the data analysis program 104, the user 106 may select one or more of these data fields from the source data listing 200 for the row labels, column labels, and data values to be displayed in the summary table. According to embodiments described herein, the data analysis program 104 may further allow the user to specify multiple, distinct sets of row label fields and/or column label fields, allowing the data analysis program to display multiple row header areas and multiple column header areas in the summary table, as will be described in more detail below.

Figure 3A:
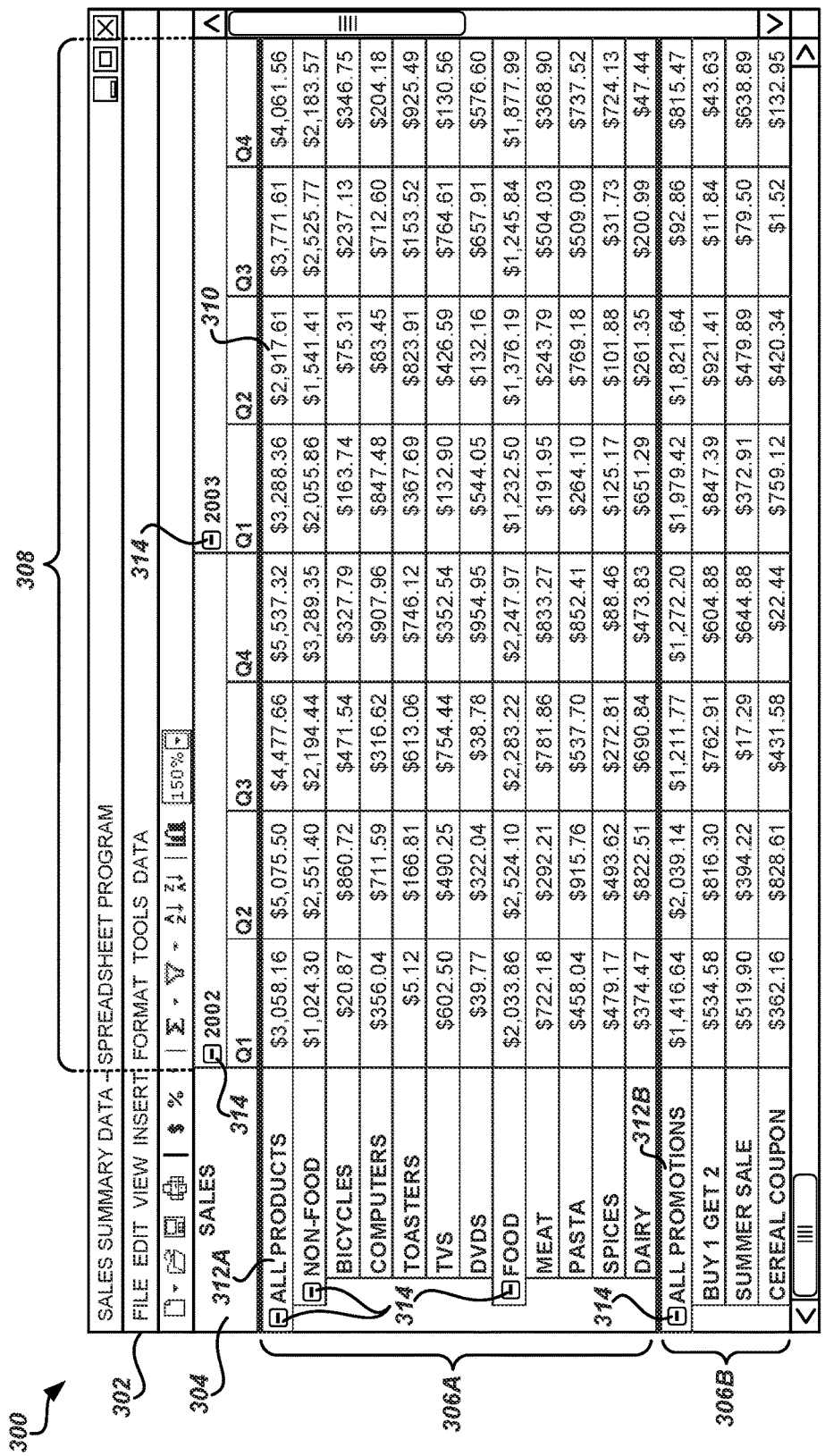
FIGS. 3A and 3B are screen diagrams showing one example of displaying a summary table containing multiple row header areas, according to embodiments described herein.

FIG. 3A shows an example screen display 300 of a window 302 rendered by the data analysis program 104 to the display device 110. The window 302 contains a summary table 304 displayed by the data analysis program 104, according to embodiments described herein. The summary table 304 consists of a grid of rows and columns constructed from the source data listing 200 described above in regard to FIG. 2. As shown in FIG. 3A, the summary table 304 contains two distinct sets of rows, or "row header areas" 306A and 306B, displayed vertically adjacent to each other in the summary table. The rows of the first row header area 306A are labeled with values obtained from the category field 210 and type field 212 provided in the source data listing 200. The rows of the second row header area 306B are labeled with values obtained from the promotion field 208. The summary table 304 also contains a single set of columns, or "column header area" 308, labeled with the values of the year field 204 and quarter field 206 from the source data listing 200. The data values, such as the data value 310, of the summary table 304 consist of the summation of the sales field 214 from the source data listing 200, across the specified category and type or promotion indicated by the row labels and within the quarter indicated by the column label, as further shown in FIG. 3A.

As described above, when multiple fields are selected as row labels or column labels for a single row or column header area, then the data analysis program 104 may display the row or columns labels for the area as a hierarchy, based upon the order of the fields specified for the labels. For example, as shown in FIG. 3A, the first row header area 306A comprises row labels from the category field 210 and the type field 212, respectively. Accordingly, the row labels for the first row header area 306A are displayed hierarchically, with the types "rolling-up" into their respective categories. In other words, the data values for the types "BICYCLES," "COMPUTERS," "TOASTERS," etc. are aggregated under the category of "NON-FOOD," while the data values for types "MEAT," "PASTA," "SPICES," etc. are aggregated under the category "FOOD." Similarly, the column header area 308 comprises labels for quarters which roll-up into their respective years.

According to one embodiment, when multiple row header areas 306A, 306B are present in the summary table 304, the data analysis program 104 further provides an aggregate row label 312A, 312B for each row header area. For example, in the summary table 304 shown in FIG. 3A, an aggregate row label 312A of "ALL PRODUCTS" is displayed in the first row header area 306A, and an aggregate row label 312B of "ALL PROMOTIONS" is displayed in the second row header area 306B. All the row labels of each row header area 306A, 306B roll-up into their respective aggregate row label 312A, 312B. The aggregate row labels 312A, 312B allow the rows of an individual row header area 306A, 306B to be collapsed and summarized as a single row, without affecting the display of the other row header areas, as will be described in more detail below.

The data analysis program 104 may further provide the ability to expand and collapse the levels of a row label or column label hierarchy to allow the user 106 to manipulate the displayed summary table 304. For example, as shown in FIG. 3A, the data analysis program 104 may provide collapse/expand controls 314 adjacent to row and column labels in their respective hierarchies when data may be rolled up to the level represented by the label. When an individual collapse/expand control 314 is selected by a user, the rows beneath the selected row in the hierarchy are collapsed, leaving only the selected row visible, with the associated data values, such as the data value 310, summarized at the corresponding level.

For example, if the collapse/expand control 314 adjacent to the aggregate row label "ALL PROMOTIONS" is selected by the user 106, the data analysis program 104 may collapse the second row header area 306B to a single row, as shown in FIG. 39. Similarly, if the collapse/expand control 314 adjacent to the column label "2003" is selected by the user 106, the data analysis program 104 may collapse the "Q1," "Q2," "Q3," and "Q4" occurring beneath 2003 level in the corresponding hierarchy into a single column, containing data values, such as the data value 310, summarized to the 2003 level, as further shown in FIG. 39.

Figure 3B:
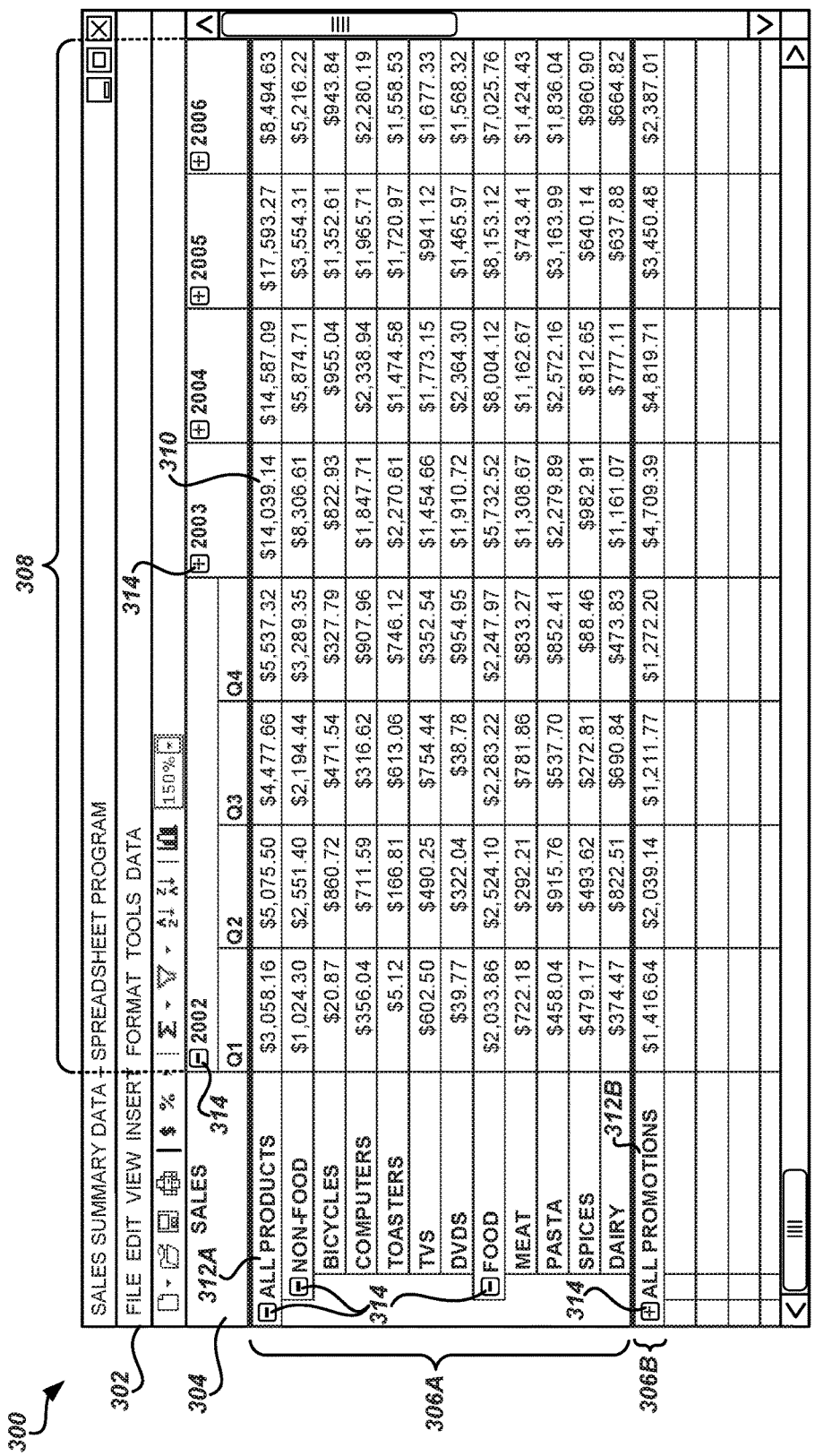

According to another embodiment, operations performed in regard to one row header area 306A, 306B may be executed without affecting the display of the other row header areas in the summary table 304. For example, as shown in FIG. 3B, collapsing the rows of the second row header area 306B to a single, aggregate row does not cause the rows of the first row header area 306A to likewise collapse to a single, aggregate row. Similarly, if the data analysis program 104 applies a row-level filter, such as the selection of the top ten values, or a row-level sort to a specific row header area 306A, 306B, the filter or sort will affect that row header area only, while the display of other row header areas in the summary table 304 remain unaltered.

In contrast, operations performed in regard to a column header area 308 may affect all row header areas 306A, 306B in the summary table 304. For example, as further shown in FIG. 3B, collapsing the columns under the column label "2003" affects the display of both the first row header area 306A and the second row header area 306B. In addition, table level operations applied to the summary table 304, such as table level data filters, modification of the selected data value fields, or application of summarization functions to the data values, will equally affect all row header areas 306A, 306B of the summary table, according to a further embodiment.

Figure 4:
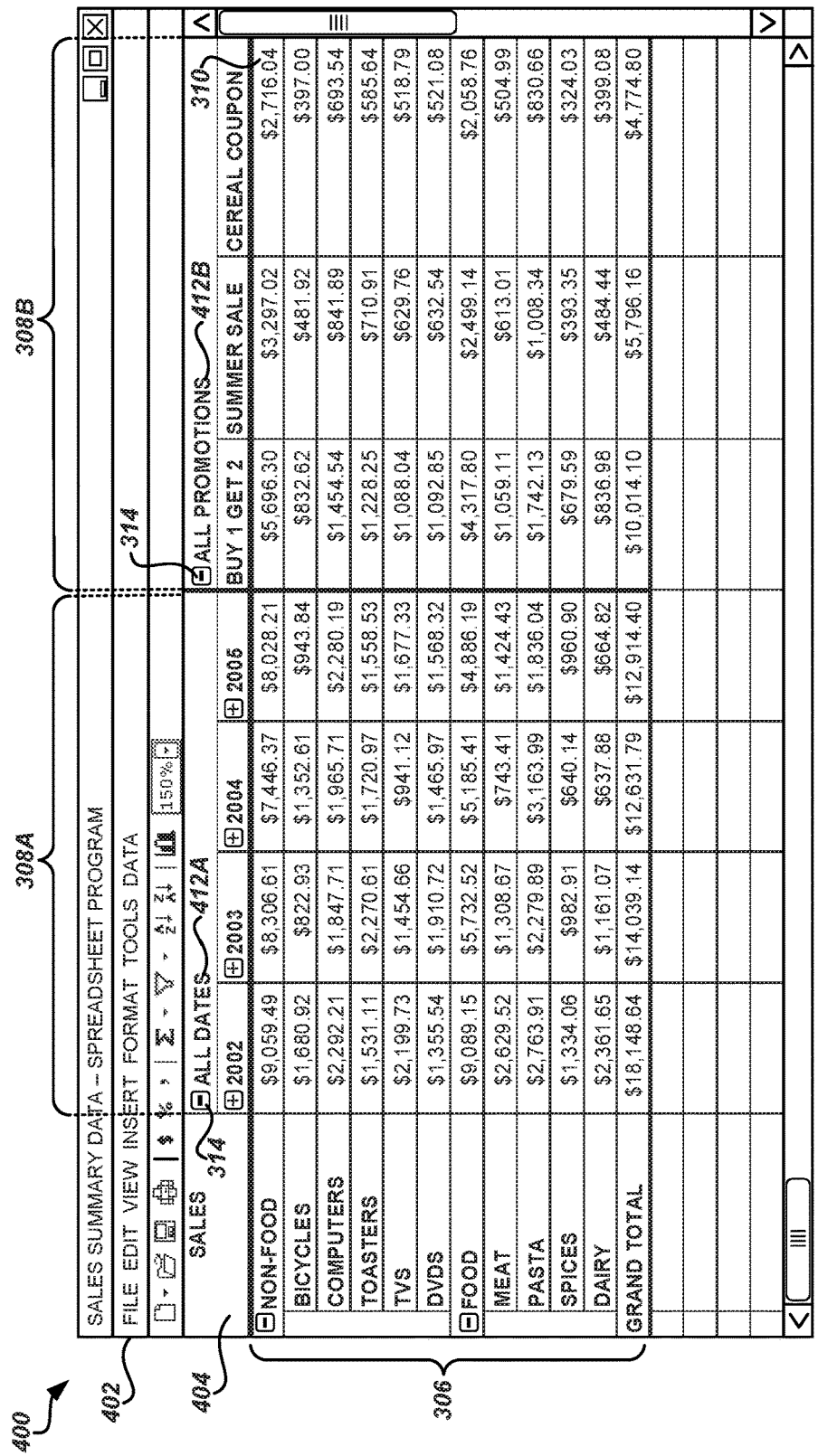
FIG. 4 is a screen diagram showing another example of displaying a summary table containing multiple column header areas, according to embodiments described herein.

FIG. 4 shows another example screen display 400 of a window 402 rendered by the data analysis program 104 to the display device 110. The window 402 contains a summary table 404 having two, distinct column header areas 308A and 308B, displayed horizontally adjacent to each other in the summary table. The columns of the first column header area 308A are labeled with values obtained from the year field 204 and quarter field 206 provided in the source data listing 200. The rows of the second column header area 3083 are labeled with values obtained from the promotion field 208. The summary table 404 further contains a single row header area 306 labeled with the values from the category field 210 and type field 212 from the source data listing 200. The data values, such as the data value 310, of the summary table 404 consist of the summation of the sales field 214 from the source data listing 200, as described above in regard to FIG. 3A.

Just as described above in regard to FIGS. 3A and 3B, when multiple column header areas 308A, 3083 are present in the summary table 404, the data analysis program 104 may provide aggregate column labels 412A, 412B for each column header area, according to one embodiment. For example, in the summary table 404 shown in FIG. 4, an aggregate column label 412A of "ALL DATES" is displayed in the first column header area 308A, and an aggregate column label 412B of "ALL PROMOTIONS" is displayed in the second column header area 308B. Further, according to embodiments, operations performed in regard to one column header area 308A, 308B, such as collapsing the column header area to a single column or applying a column level filter, may be executed without affecting the display of the other column header areas in the summary table 404. However, operations performed in regard to the row header area 306, or applied to the summary table 404 as a whole, may affect all column header areas 308A, 308B in the summary table.

It will be appreciated that additional configurations of summary tables beyond those described above may be utilized, including a summary table having a single column header area with three or more row header areas, a summary table having a single row header area with three or more column header areas, or a summary table having both multiple row header areas and multiple column header areas. In addition different fields from the source data may be selected for the data values displayed in conjunction with each of the multiple row header areas or column header areas. It will be further appreciated that the features and characteristics described herein apply equally to all such configurations, and it is intended that this application include all such configurations.

Figure 5:
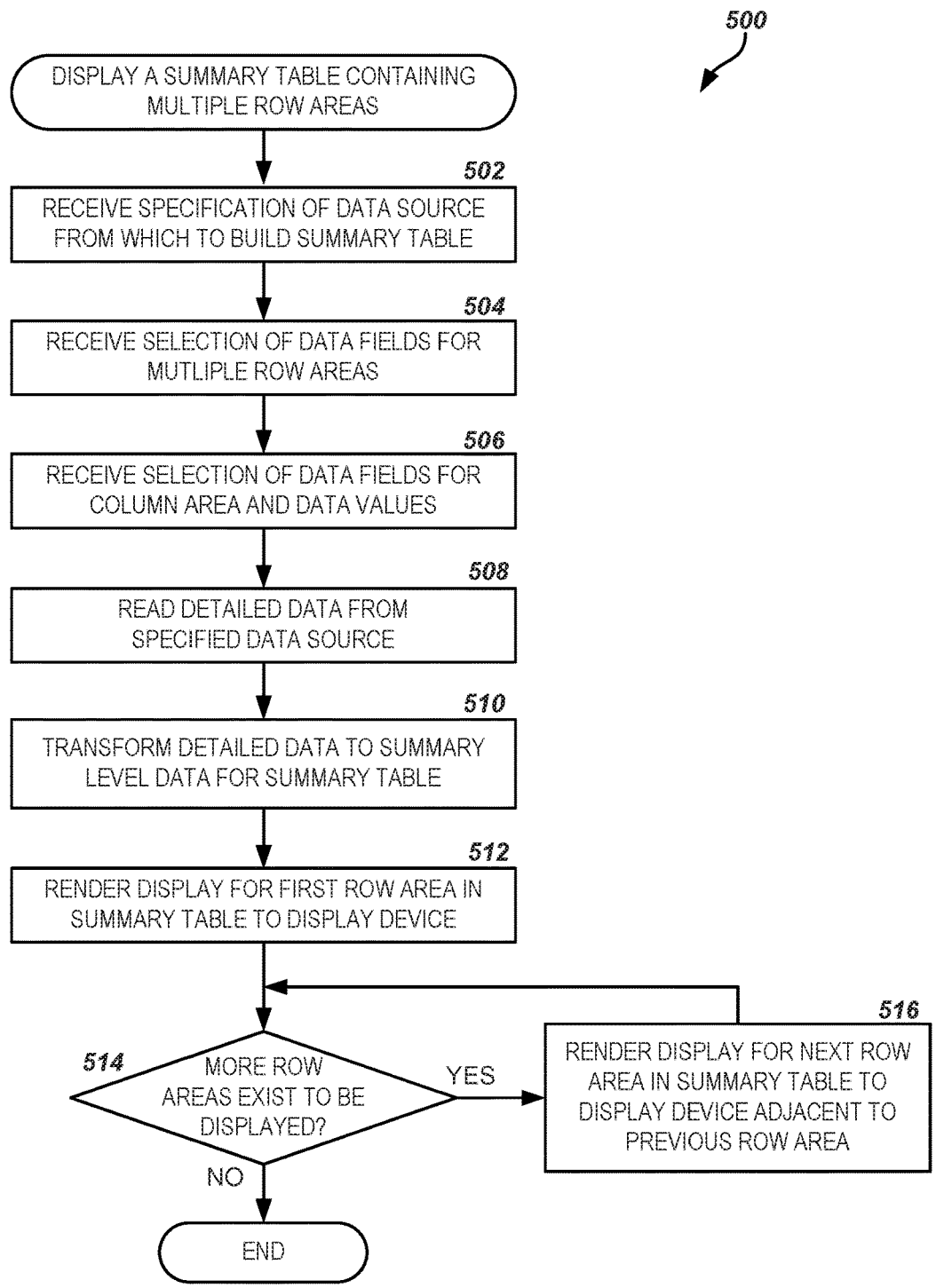
FIG. 5 is a flow diagram showing one method for displaying multiple row header areas in a summary table, according to embodiments described herein.

Referring now to FIG. 5, additional details will be provided regarding the embodiments presented herein. It should be appreciated that the logical operations described with respect to FIG. 5 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. The operations may also be performed in a different order than described.

FIG. 5 illustrates a routine 500 for rendering a summary table having multiple row header areas to a display device 110, as described above in regard to FIGS. 3A and 3B. The routine 500 begins at operation 502, where the data analysis program 104 receives a specification of a data source 108 from which to build the summary table. As described above in regard to FIG. 1, the data for the summary table may be retrieved from a spreadsheet file or other data file on a file system accessible by the computer 102, or it may be contained in a database. The data from the data source 108 may be in the format of a source data listing 200, like that described above in regard to FIG. 2.

From operation 502, the routine 500 proceeds to operation 504, where the data analysis program 104 receives a selection from the user 106 of data fields for the row labels for each of the multiple row header areas 306A, 306B to be displayed in the summary table 304. For example, the user 106 may specify that the summary table 304 should have two row header areas 306A, 306B, with the row labels for the first row header area 306A obtained from the category field 210 and type field 212 provided in the source data listing 200, and the row labels for the second row header area 306B obtained from the promotion field 208.

Figures 6A, 6B:
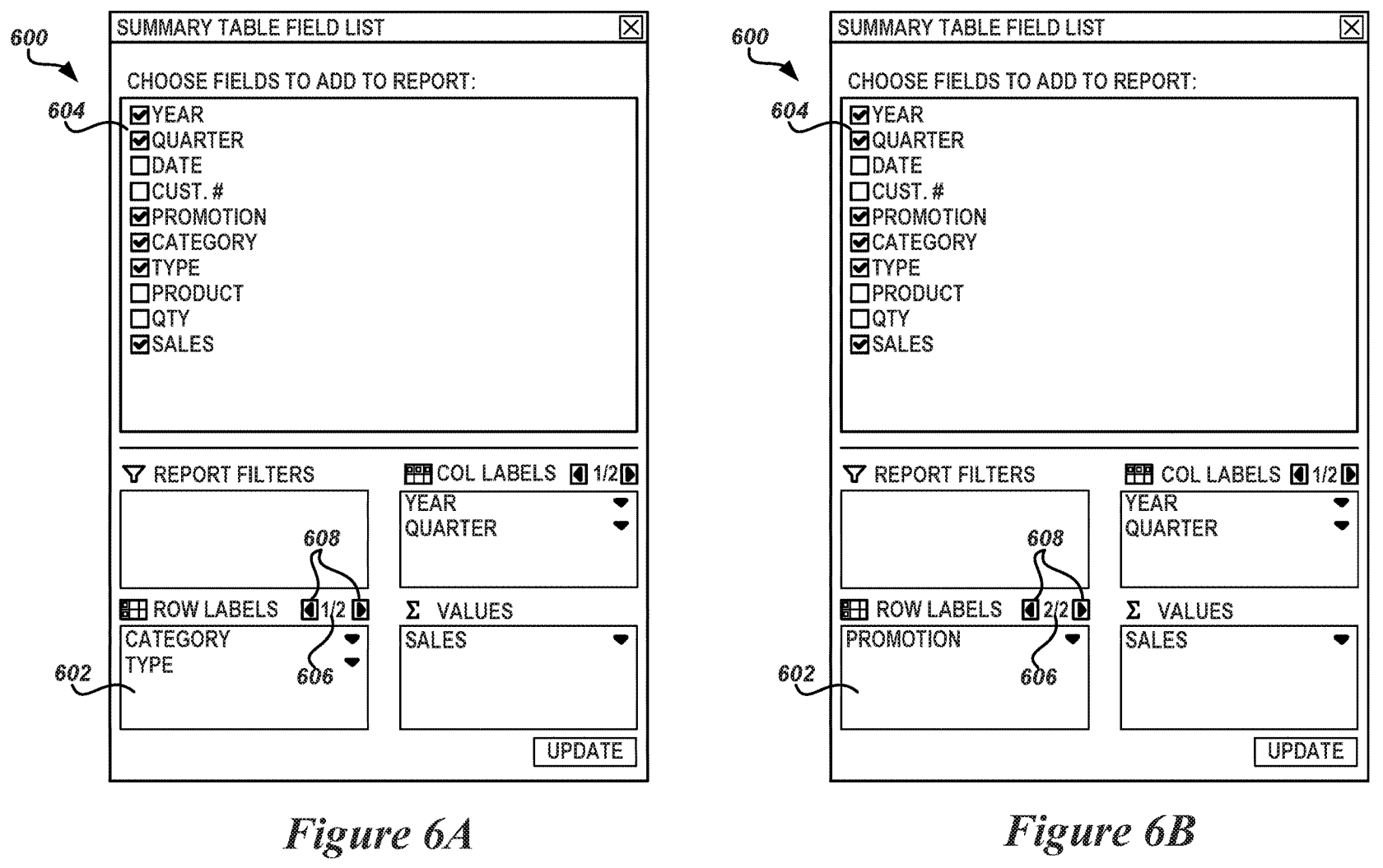

According to one embodiment, the data analysis program 104 may provide a user interface ("UI"), such as the summary table field list window 600 shown in FIGS. 6A and 6B, to the user 106 in order for the user to make the appropriate selections of row labels for each of the multiple row header areas 306A, 306B. The field list window 600 includes a row label selection area 602 where the data fields for the row labels are specified. The selected data fields may be dragged from a data fields list 604 into the row label selection area 602 in order to select the data field for a row label. In order to facilitate multiple row header areas 306A, 306B, the row label selection area 602 may further include a current row header area indicator 606, which shows the current row header area for which field selections may be made as well as the total number of row header areas available. The user may select a row header area selection control 608 to increment or decrement the current row header area active in the row label selection area 602.

For example, as shown in FIG. 6A, the user may select the category field 210 and type field 212 for row labels for the first row header area 3064 of two row header areas. By selecting the increment row header area selection control 608, the selected fields for the second row header area 306B may be displayed in the row label selection area 602, which may comprise the promotion field 208, as shown in FIG. 6B. It will be appreciated that other UIs may be utilized for making selections of data fields for row labels for multiple row header areas, beyond those shown in FIGS. 6A and 6B and described herein. It is intended that this application include all such UIs.

From operation 504, the routine 500 proceeds to operation 506, where the data analysis program 104 receives the selection of fields for the column header area 308 and for the data values 310. This may be accomplished using the summary table field list window 600 shown in FIGS. 6A and 6B and described above, or some other UI. The data analysis program 104 also receives any additional selections or parameters necessary to render the summary table 304 at operation 506. Next, the routine 500 proceeds to operation 508, where the data analysis program 104 reads the source data from the data source 108 specified in operation 502. This may involve reading a spreadsheet file from a file system or executing a query on database server, for example.

Next, the routine 500 proceeds from operation 508 to operation 510, where the data analysis program 104 transforms the source data from the data source 508 to the summary level data used to build the summary table 304. This may be accomplished by applying summarization functions to the source data to produce the summary level data required to render the summary table display, based on the field selections from operations 504 and 506 above as well as any other any additional selections or parameters.

From operation 510, the routine 500 proceeds to operation 512, where the data analysis program 104 renders the display of the first row header area 306A of the summary table 304 to the display device 110. The data rows 202 from the data source 108 are evaluated to determine the applicable row label values for the row header area 306A based upon the selected data fields from operation 504. A hierarchy of row labels for the row header area 3064 is also constructed, if applicable. As discussed above in regard to FIG. 3A, the data analysis program 104 may also include an aggregate row label 312A for the row header areas 306A to allow the row header area to be rolled up and summarized in a single row by the user 106. Rows are added to the summary table grid containing each label value, and the data values 310 are summarized across the various column labels in the row, based upon the data fields selected for the column header area 308 and the summary level data.

From operation 512, the routine 500 proceeds to operation 514, where the data analysis program 104 determines if there are additional row header areas to be displayed in the summary table 304. This may be accomplished by determining if data fields have been specified for additional row header areas in the row label selection area. 602 of the summary table field list window 600, according to one embodiment. If additional rows header areas are to be displayed, the routine 500 proceeds to operation 516, where the data analysis program 104 renders the display for the next row header area 306B vertically adjacent to and below the previous row header area 306A. The next row header area 306B is displayed using a similar procedure to the first row header area 306A described above in regard to operation 512. Once the display for the next row header area 306B has been rendered by the data analysis program 104, the routine 500 returns from operation 516 to operation 514, where the data analysis program 104 determines if there are additional row header areas to be displayed in the summary table 304. If no more row header areas are to be displayed, then the routine 500 ends.

It will be appreciated that a similar routine to the routine 500 described above could be utilized by the data analysis program 104 to display a summary table 404 with multiple column header areas 308A, 308B, wherein each subsequent column header area would be displayed in the summary table horizontally adjacent to the previous column header area. Similarly, a combined routine could be utilized by the data analysis program 104 to display a summary table with both multiple row header areas and multiple column header areas. It is intended that these routines also be included in this application.

Figure 7:
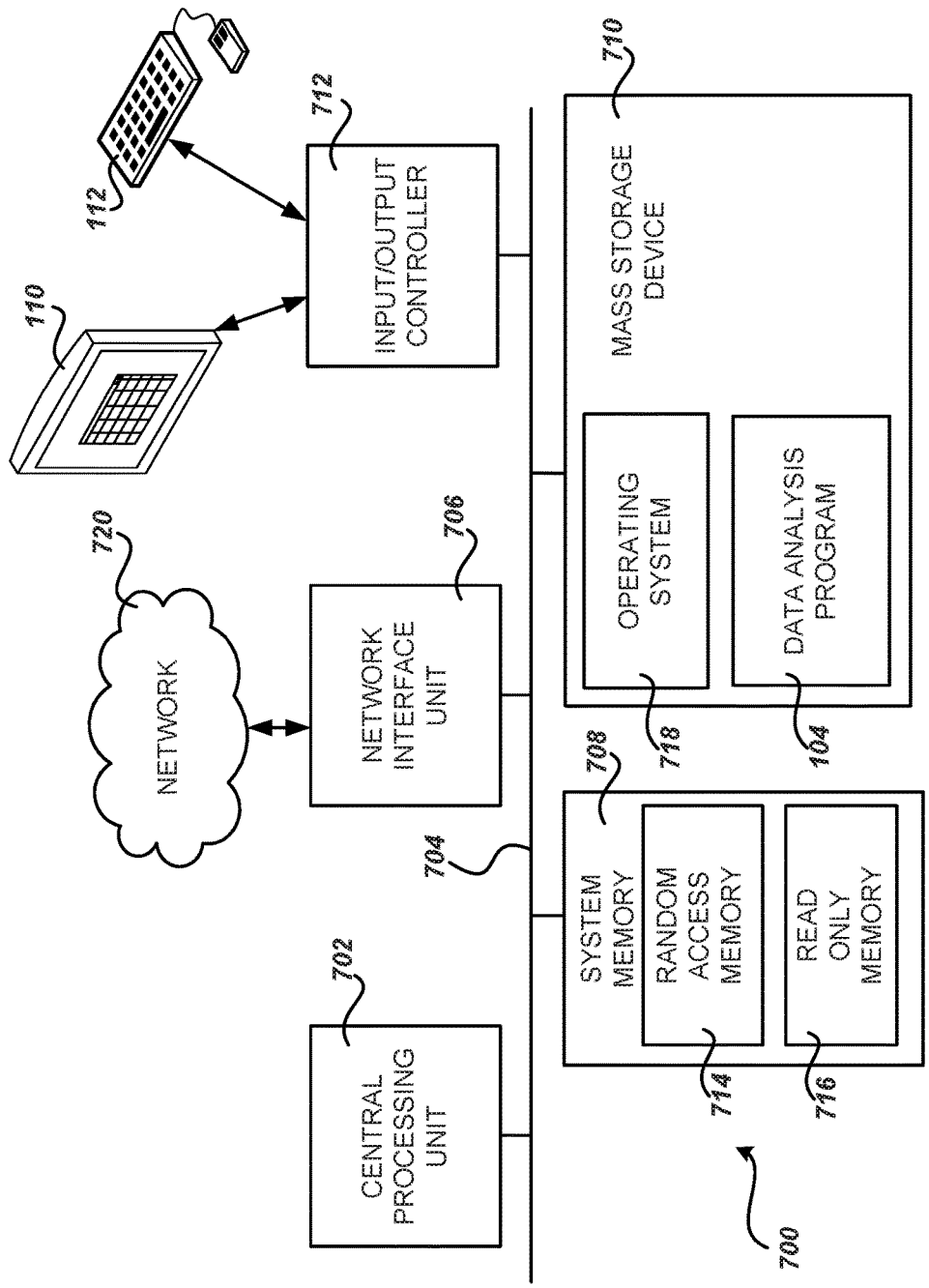
FIG. 7 is a block diagram showing illustrative computer hardware and software architectures for a computing system capable of implementing aspects of the embodiments presented herein.

FIG. 7 shows an example computer architecture for a computer 700 capable of executing the software components described herein for displaying multiple row and column header areas in a summary table, in the manner presented above. The computer architecture shown in FIG. 7 illustrates a conventional computing device, PDA, digital cellular phone, communication device, desktop computer, laptop, or server computer and may be utilized to execute any aspects of the software components presented herein described as executing on the computer 102 or other computing platform.

The computer architecture shown in FIG. 7 includes a central processing unit 702 (CPU), a system memory 708, including a random access memory 714 (RAM) and a read-only memory 716 (ROM), and a system bus 704 that couples the memory to the CPU 702. A basic input/output system containing the basic routines that help to transfer information between elements within the computer 700, such as during startup, is stored in the ROM 716. The computer 700 also includes a mass storage device 710 for storing an operating system 718, application programs, and other program modules, which are described in greater detail herein.

The mass storage device 710 is connected to the CPU 702 through a mass storage controller (not shown) connected to the bus 704. The mass storage device 710 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available computer storage media that can be accessed by the computer 700.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 700.

According to various embodiments, the computer 700 may operate in a networked environment using logical connections to remote computing devices and computer systems through a network 720. The computer 700 may connect to the network 720 through a network interface unit 706 connected to the bus 704. It should be appreciated that the network interface unit 706 may also be utilized to connect to other types of networks and remote computer systems. The computer 700 may also include an input/output controller 712 for receiving and processing input from a number of input devices 112, including a keyboard, a mouse, a touchpad, a touch screen, an electronic stylus, or other type of input device. Similarly, the input/output controller 712 may provide output to a display device 110, such as a computer monitor, a flat-panel display, a digital projector, a printer, a plotter, or other type of output device.

As mentioned briefly above, a number of program modules and data files may be stored in the mass storage device 710 and RAM 714 of the computer 700, including an operating system 718 suitable for controlling the operation of a computer. The mass storage device 710 and RAM 714 may also store one or more program modules. In particular, the mass storage device 710 and the RAM 714 may store the data analysis program 104, which was described in detail above in regard to FIG. 1. The mass storage device 710 and the RAM 714 may also store other types of program modules or data. In one embodiment, the program modules are embodied in computer-readable media containing instructions that, when executed by the CPU 702, perform the routine 500 for displaying a summary table having multiple row header areas, as described in greater detail above in regard to FIG. 5.

Based on the foregoing, it should be appreciated that technologies for displaying multiple row and column header areas in a summary table are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for displaying a summary table having a plurality of adjacent header areas, the method comprising:
    receiving a selection of one or more data fields for each of a plurality of adjacent header areas of a summary table, the selection of the one or more data fields associated with a respective header area having at least one data field different from the selection of the one or more data fields associated with other header areas of the plurality of adjacent header areas;
    reading data from a data source containing values for the one or more data fields associated with the plurality of adjacent header areas;
    transforming the data from the data source containing values for the plurality of adjacent header areas to build the summary table; and
    rendering the plurality of adjacent header areas in the summary table, wherein each of the plurality of adjacent header areas comprise different groupings of rows or columns produced from the received selection of one or more data fields, and wherein the plurality of adjacent header areas includes a subsequent header area displayed substantially adjacent to a previous header area in the summary table.

2. The computer-implemented method of claim 1, wherein the plurality of adjacent header areas comprises two or more row header areas, and wherein the two or more row header areas are rendered substantially vertically adjacent to each other in the summary table.

3. The computer-implemented method of claim 2, where operations performed regarding a column header area of the summary table affects the display of each of the two or more row header areas.

4. The computer-implemented method of claim 1, wherein the plurality of adjacent header areas comprises two or more column header areas, and wherein the two or more column header areas are rendered substantially horizontally adjacent to each other in the summary table.

5. The computer-implemented method of claim 4, where operations performed regarding a row header area of the summary table affects the display of each of the two or more column header areas.

6. The computer-implemented method of claim 1, wherein an aggregate label is displayed in one of the plurality of adjacent header areas, such that data associated with the one of the plurality of adjacent header areas may be summarized for an entirety of the one of the plurality of adjacent header areas.

7. The computer-implemented method of claim 1, wherein the selection of the one or more data fields for each of the plurality of adjacent header areas is received in a label selection area, and wherein the label selection area is configured to receive the one or more data fields when dragged from a list of a plurality of available data fields.

8. The computer-implemented method of claim 7, wherein the label selection area includes a selection control that displays respective sets of data fields for the labels used in respective headers of the plurality of adjacent headers.

9. The computer-implemented method of claim 1, wherein the summary table is rendered by a spreadsheet program, and wherein the data source comprises a spreadsheet maintained in the spreadsheet program.

10. The computer-implemented method of claim 1,
wherein the different groupings of rows or columns in the respective header areas are provided from a first grouping of aggregated data from at least a first data field and a second grouping of aggregated data from at least a second data field, and
wherein at least a portion of values in the first grouping of aggregated data overlap with values in the second grouping of aggregated data.

11. A computer-readable storage medium, excluding a transitory signal, the storage medium having computer executable instructions stored thereon that, when executed by a computer, cause the computer to:
receive a data field selection of one or more data fields of a data source for each of a plurality of adjacent header areas of a summary table, the selection of the one or more data fields associated with a respective header area having at least one data field different from the selection of the one or more data fields associated with other header areas of the plurality of adjacent header areas;
obtain data containing values for the one or more data fields associated with the plurality of adjacent header areas;
transform the data from the data source containing values for the plurality of adjacent header areas to build the summary table; and
render the plurality of adjacent header areas in the summary table, wherein each of the plurality of adjacent header areas comprise different groupings of rows or columns produced from the received selection of one or more data fields, and wherein a subsequent header area is rendered substantially adjacent to a previous header area in the summary table.

12. The computer-readable storage medium of claim 11, wherein the plurality of adjacent header areas comprises two or more row header areas, and wherein the two or more row header areas are rendered substantially vertically adjacent to each other in the summary table.

13. The computer-readable storage medium of claim 12, where operations performed regarding a column header area of the summary table affects a display of each of the two or more row header areas.

14. The computer-readable storage medium of claim 11, wherein the plurality of adjacent header areas comprises two or more column header areas, and wherein the two or more column header areas are rendered substantially horizontally adjacent to each other in the summary table.

15. The computer-readable storage medium of claim 14, where operations performed regarding a row header area of the summary table affects a display of each of the two or more column header areas.

16. The computer-readable storage medium of claim 11, wherein operations performed with one of the plurality of adjacent header areas in the summary table do not affect a display of other of the plurality of adjacent header areas.

17. The computer-readable storage medium of claim 11, wherein the selection of the one or more data fields for each of the plurality of adjacent header areas is received in a label selection area, wherein the label selection area is configured to receive the one or more data fields when dragged from a list of a plurality of available data fields, and wherein the label selection area includes a selection control that displays respective sets of data fields for the labels used in respective headers of the plurality of adjacent headers.

18. A system for displaying a summary table having a plurality of adjacent header areas that establish row header areas or column header areas, the system comprising:
a computer comprising processing circuitry; and
a storage medium comprising data analysis program instructions, wherein the data analysis program instructions, when executed by the processing circuitry of the computer, cause the processing circuitry to:
receive a selection of one or more data fields for each of the plurality of row header areas or column header areas, the selection of the one or more data fields associated with a respective header area having at least one data field different from the selection of the one or more data fields associated with other header areas of the plurality of adjacent header areas,
receive data containing values for the one or more data fields associated with the plurality of adjacent header areas;
transform the data containing values for the plurality of adjacent header areas to build the summary table, and
render the plurality of row header areas or column header areas in the summary table,
wherein each of the plurality of adjacent header areas comprise different groupings of rows or columns produced from the received selection of one or more data fields,
wherein the plurality of row header areas are displayed substantially vertically adjacent to each other in the summary table and the plurality of column header areas are displayed substantially horizontally adjacent to each other in the summary table, and
wherein operations performed in regard to one of the plurality of row header areas do not affect a display of other of the plurality of row header areas and operations performed regarding one of the plurality of column header areas do not affect a display of other of the plurality of column header areas in the summary table.

19. The system of claim 18, wherein the data analysis program instructions are executed on the processing circuitry by a spreadsheet software program, and wherein the data comprises a spreadsheet maintained by the spreadsheet software program.

20. The system of claim 18, wherein the selection of the one or more data fields for each of the plurality of adjacent header areas is received in a label selection area, and wherein the label selection area includes a selection control to display respective sets of data fields for the labels used in respective headers of the plurality of adjacent headers.

* * * * *